(12) United States Patent
Tang et al.

(10) Patent No.: US 12,535,919 B2
(45) Date of Patent: Jan. 27, 2026

(54) ROUTING METHODS AND PIN CONFIGURATIONS FOR PORTABLE DEVICE DISPLAY PANEL

(71) Applicant: NOVATEK Microelectronics Corp., Hsin-Chu (TW)

(72) Inventors: Yu-Ying Tang, Taoyuan (TW); Chih-Chang Lai, Taichung (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/739,292

(22) Filed: Jun. 10, 2024

(65) Prior Publication Data

US 2025/0224843 A1 Jul. 10, 2025

Related U.S. Application Data

(60) Provisional application No. 63/617,750, filed on Jan. 4, 2024.

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/04164* (2019.05)

(58) Field of Classification Search
CPC ... G06F 3/0446; G06F 3/04164; G06F 3/0412
See application file for complete search history.

(56) References Cited

U.S. PATENT DOCUMENTS

2021/0043693 A1\* 2/2021 Kim ..................... A61B 5/6898

\* cited by examiner

*Primary Examiner* — Robert J Michaud
(74) *Attorney, Agent, or Firm* — Winston Hsu

(57) ABSTRACT

A portable device includes: an integrated circuit (IC) including a first receiver pin, a first transmitter pin, a second receiver pin and a second transmitter pin; and a touch display panel including a capacitive array. A first trace of a first plurality of traces is coupled between a leftmost transmitter element of the capacitive array and positioned closest to the capacitive array at the top and side and furthest away from the capacitive array at the bottom, and a second trace of the first plurality of traces is coupled between a rightmost transmitter element of the capacitive array and positioned furthest away from the capacitive array at the top and side and closest to the capacitive array at the bottom.

19 Claims, 17 Drawing Sheets

ROUTING METHODS AND PIN CONFIGURATIONS FOR PORTABLE DEVICE DISPLAY PANEL

CROSS REFERENCE TO RELATED APPLICATIONS

This application claims the benefit of U.S. Provisional Application No. 63/617,750, filed on Jan. 4, 2024. The content of the application is incorporated herein by reference.

BACKGROUND OF THE INVENTION

1. Field of the Invention

The present invention is directed to portable electronic devices, and more particularly, to different routing methods and pin configurations for electronic traces coupling to an integrated circuit of a portable electronic device with a touch display driver integration (TDDI) display panel. The routing methods can reduce a coupling effect in a display panel of the portable electronic device and the different pin configurations enable the portable electronic device to have a more compact design.

2. Description of the Prior Art

Touch Display Driver Integration (TDDI) integrates a touch panel integrated circuit (IC) with a source driver, enabling the display driver and the touch sensor to be in one chip, wherein everything is built into the display. This allows the IC to be directly bonded to the touch panel. As well as saving space, this technique also eliminates the need for additional layers in the touch display panel. The result is that the entire device is thinner and lighter, and also has a brighter display as fewer layers means less reflection.

A standard touch display is comprised of a capacitive sensor array which is formed of column sensor elements (transmitting/Tx electrodes) and row sensor elements (receiving/Rx electrodes). In the TDDI configuration, wiring (traces) from the capacitor sensor array are pulled directly into the IC without passing through a flexible printed circuit (FPC). The IC will comprise dedicated pins for coupling to the traces from the transmitting electrodes and dedicated pins for coupling to the traces from the receiving electrodes. As the IC is bonded directly to the touch panel, it is difficult to change the pin configuration of the IC after it is manufactured. The length and width of the wiring traces will affect their individual resistance and capacitance, meaning there are certain limitations when it comes to the placement of the traces in and around the touch display panel. In addition, coupling that occurs between different traces will also affect the wire routing method.

A standard implementation of a TDDI is a 1T1R panel, wherein there is a single IC which couples to the panels/traces. Refer to FIG. 1, which illustrates a 1T1R touch display panel 160 coupled to a flat printed circuit (FPC) 180, wherein the routing of traces from the transmitting and receiving electrodes to the Tx and Rx pins of the IC 150 are shown in the diagram. In this design, the receiving traces are routed alternately via the right side or the left side of the touch display 160, while the transmitting traces are coupled from the bottom of the capacitive array directly to the IC.

In a 2T1R panel, however, the transmitting traces are coupled to the top and the bottom of each transmitter sensor element. Refer to FIG. 2, which illustrates a routing method 200 for a 2T1R panel 200. As shown in the diagram, traces from the receiving electrodes are alternately routed to the right and the left side of the display 260, and the transmitting electrodes are similarly alternately routed (from the top of the array) to the left or the right. This results in the receiving and transmitting traces being positioned close together at the sides of the display, which can lead to coupling between the traces.

FIG. 3 illustrates an alternative routing method 300 for a 2T1R panel 360. In the embodiment shown in FIG. 3, the traces are separated so that the transmitting traces are formed on the left side of the display panel 360 and the receiving traces are formed on the right side of the display panel 360. Although this routing method prevents long parallel Tx and Rx traces being formed at the vertical sides of the display panel 360, the Tx and Rx traces are still close to each other at the bottom side of the panel 360.

The coupling issue is illustrated in FIG. 4, which is a diagram of a portable device 430 being held by a user's hand. As shown in the diagram, a user will hold the portable device 430 at the points where the transmitting and receiving traces are positioned closest to each other. Contact from the hand in conjunction with the coupling between the traces can result in ghost touch areas of the touch display panel, or may initiate an undesired touch action. Holding the portable device 430 in a vertical orientation will result in erroneous touch results due to coupling when the routing method illustrated in FIG. 2 is used. When the device 430 is held horizontally, erroneous touch results due to coupling may still occur if the routing method illustrated in FIG. 3 is used, as a user will hold the phone at the shorter sides. Due to the proliferation of streaming and photo applications, holding a phone or portable device in this orientation is quite common.

In addition to the problems incurred by the above routing methods, the display panel requires a certain amount of space between the panel and the IC in order to couple the traces to the pins and various circuits within the IC. When fanout routing (traces routed at a 45 degree angle) is employed, the pin orientation of the IC will require a specific space for all electronic0 traces. As detailed above, the pin configuration is usually set during the manufacturing process and cannot be changed. If the pin configuration of the IC could be altered, the space between the display panel and the IC could be reduced, which would further the aim of manufacturing a lighter (and therefore brighter and less expensive) TDDI.

As the purpose of using TDDI is to provide smaller and more compact electronic devices, it is desired to further reduce space within the display panel required for the traces, or provide a different pin configuration which can help reduce space required for traces between the display panel and the IC.

SUMMARY OF THE INVENTION

This in mind, the present invention aims to provide different routing methods and pin configurations for a portable device comprising a touch display panel and an integrated circuit.

A first embodiment uses different routing methods in order to reduce coupling effects between the electronic traces.

A portable device according to the first embodiment comprises: an integrated circuit (IC) comprising at least a first receiver pin, a first transmitter pin, a second receiver pin and a second transmitter pin; a touch display panel, bonded directly to the IC, and comprising a capacitive array consisting of a plurality of transmitter elements arranged vertically and a plurality of receiver elements arranged horizontally; a first plurality of traces at the top, a first vertical side and the bottom of the touch display panel, and respectively coupled between a top of each transmitter element of the plurality of transmitter elements and a bottom of each transmitter element; a second plurality of traces respectively coupled between the first plurality of traces at the bottom of the capacitive array and the IC; and a third plurality of traces on a second vertical side of the touch panel integrated circuit opposite to the first side and respectively coupled between the plurality of receiver elements and the IC.

A first trace of the first plurality of traces is coupled between a leftmost transmitter element of the capacitive array and the first trace is positioned closest to the capacitive array at the top of the capacitive array, closest to the capacitive array at the first vertical side, and furthest away from the capacitive array at the bottom of the capacitive array, and a second trace of the first plurality of traces is coupled between a rightmost transmitter element of the capacitive array and the second trace is positioned furthest away from the capacitive array at the top of the capacitive array, furthest away from the capacitive array at the first vertical side, and closest to the capacitive array at the bottom of the capacitive array.

A third trace of the first plurality of traces is coupled between a centre left transmitter element of the capacitive array, and the third trace is positioned between the first trace and the second trace of the first plurality of traces at the top of the capacitive array, between the first trace and the second trace of the first plurality of traces at the first vertical side, and positioned between the first trace and the second trace of the second plurality of traces at the bottom of the capacitive array, and a fourth trace of the first plurality of traces is coupled between a centre right transmitter element, and the fourth trace is positioned between the second trace and the third trace of the first plurality of traces at the top of the capacitive array, positioned between the second trace and the third trace of the first plurality of traces at the first vertical side, and positioned between the second trace and the third trace of the second plurality of traces at the bottom of the capacitive array.

In a modification, the IC comprises: a first IC comprising the first transmitter pin and the first receiver pin and further comprising a third transmitter pin and a third receiver pin; and a second IC comprising the second transmitter pin and the second receiver pin and further comprising a fourth transmitter pin and a fourth receiver pin. A first trace of the second plurality of traces is coupled between the leftmost transmitter element at the bottom of the capacitive array and the first transmitter pin, a second trace of the second plurality of traces is coupled between the centre left transmitter element at the bottom of the capacitive array and the third transmitter pin, a third trace of the second plurality of traces is coupled between the centre right transmitter element at the bottom of the capacitive array and the fourth transmitter pin, and a fourth trace of the second plurality of traces is coupled between the rightmost transmitter element at the bottom of the capacitive array and the second transmitter pin.

In another aspect, a portable device comprises: an integrated circuit (IC), comprising a first receiver pin, a second receiver pin, a first transmitter pin, and a second transmitter pin arranged sequentially from left to right; a touch display panel, bonded directly to the IC, and comprising a capacitive array consisting of a plurality of transmitter elements arranged vertically and a plurality of receiver elements arranged horizontally; a first plurality of traces at the top, on a first vertical side, and the bottom of the touch display panel, and respectively coupled between a top of each transmitter element of the plurality of transmitter elements and a bottom of each transmitter element; a second plurality of traces respectively coupled between the first plurality of traces at the bottom of the capacitive array and the IC; and a third plurality of traces on a second vertical side of the touch panel integrated circuit opposite to the first side and respectively coupled between the plurality of receiver elements and the IC.

A first trace of the first plurality of traces is coupled between a leftmost transmitter element of the capacitive array and the first trace is positioned closest to the capacitive array at the top of the capacitive array, closest to the capacitive array at the first vertical side, and closest to the capacitive array at the bottom of the capacitive array, and a second trace of the first plurality of traces is coupled between a rightmost transmitter element of the capacitive array and the second trace is positioned furthest away from the capacitive array at the top of the capacitive array, furthest away from the capacitive array at the first vertical side, and furthest away from the capacitive array at the bottom of the capacitive array.

A second embodiment reroutes the configuration of pins and pads of an IC, in order to reduce space and provide a more compact design.

A touch display according to the second embodiment comprises: a touch display panel comprising a capacitive sensor array consisting of a plurality of transmitting electrodes and a plurality of receiving electrodes, wherein the transmitting electrodes and the receiving electrodes are arranged at 90 degrees with respect to each other; and an integrated circuit (IC) coupled to the touch display panel. The IC comprises: at least a first pin and a second pin of a first type for coupling to electronic traces of the first type coupled to the capacitive array, and at least a first pin and a second pin of a second type for coupling to electronic traces of the second type coupled to the capacitive array, wherein the first pin and the second pin of the second type are positioned in between the first pin and the second pin of the first type. The first type and the second type are selected according to an arrangement of the transmitting electrodes and the receiving electrodes in the capacitive array.

In one aspect, when the transmitting electrodes are arranged vertically in the capacitive array, the first type is selected as a transmitting type and the second type is selected as a receiving type. In another aspect, when the receiving electrodes are arranged vertically in the capacitive array, the first type is selected as a receiving type and the second type is selected as a transmitting type.

The IC further comprises a first display source pad and a second display source pad, and the first pin of the first type, the first pin of the second type, the second pin of the second type and the second pin of the first type are positioned between the first display source pad and the second display source pad. In a modification, the IC further comprises: a first control circuit coupled to the first pin of the first type and the first pin of the second type, wherein the first control circuit adaptively selects the first type and the second type; and a second control circuit coupled to the second pin of the first type and the second pin of the second type, wherein the second control circuit adaptively selects the first type and the second type.

In a modification, the IC further comprises at least a third pin and a fourth pin of the second type, and the third pin and the fourth pin are positioned between the first pin and the second pin of the second type. The IC further comprises at least a first source pad, a second source pad and a third source pad, and the third pin is positioned between the first source pad and the second source pad, and the fourth pin is positioned between the second source pad and the third source pad.

These and other objectives of the present invention will no doubt become obvious to those of ordinary skill in the art after reading the following detailed description of the preferred embodiment that is illustrated in the various figures and drawings.

DETAILED DESCRIPTION

A first embodiment addresses the coupling issues of a TDDI employed in a 2T1R capacitive array by providing a plurality of routing methods for routing the traces from the capacitive array to the IC, wherein a coupling distance between Rx and Tx traces is effectively reduced.

A second embodiment changes a configuration of pins on the IC which can address the coupling issue as well as reducing space between the array and the IC.

Figure 1:
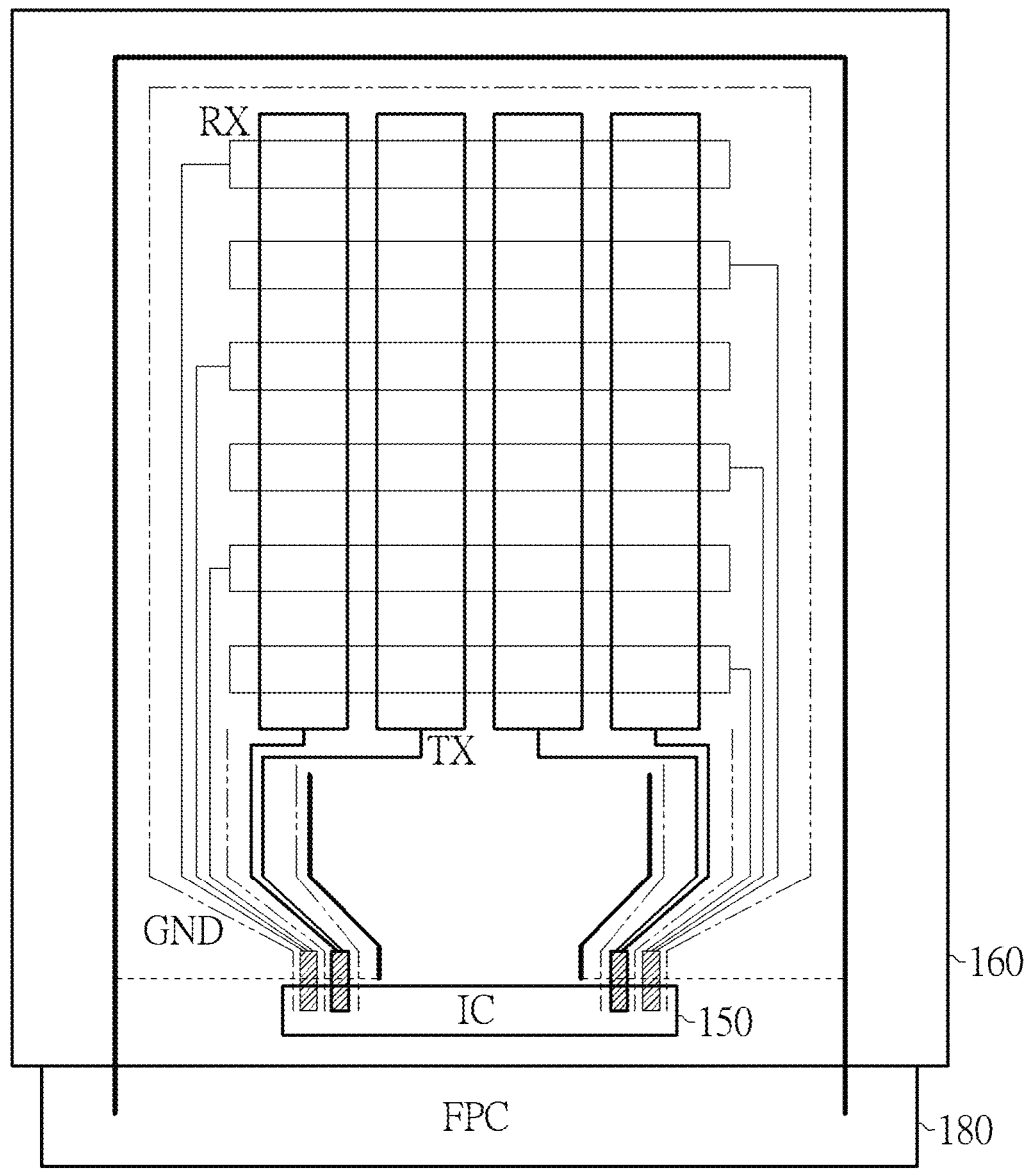
FIG. 1 is a diagram of a TDDI panel according to a first embodiment.
Figure 2:
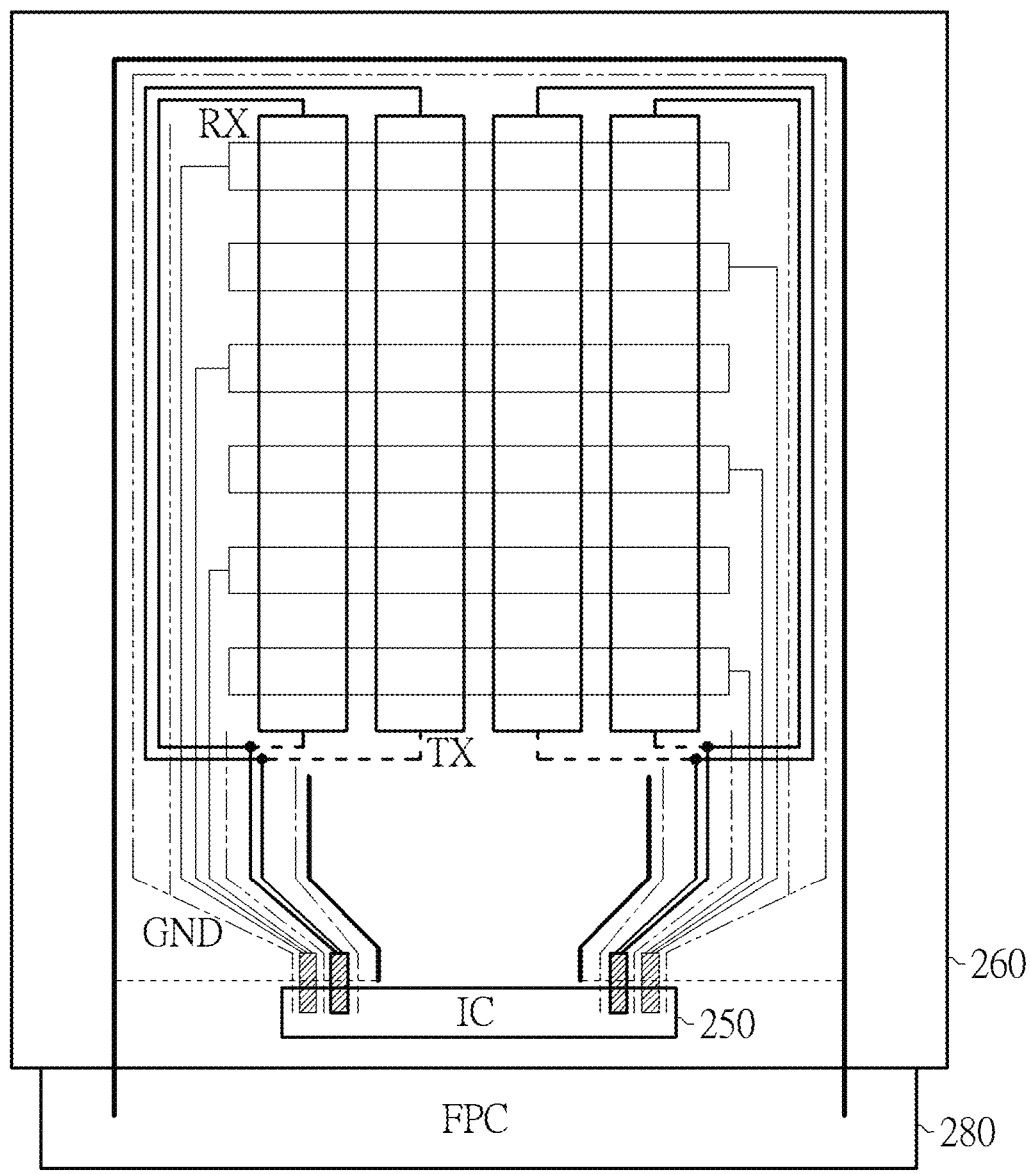
FIG. 2 is a diagram of a TDDI panel according to a second embodiment.
Figure 3:
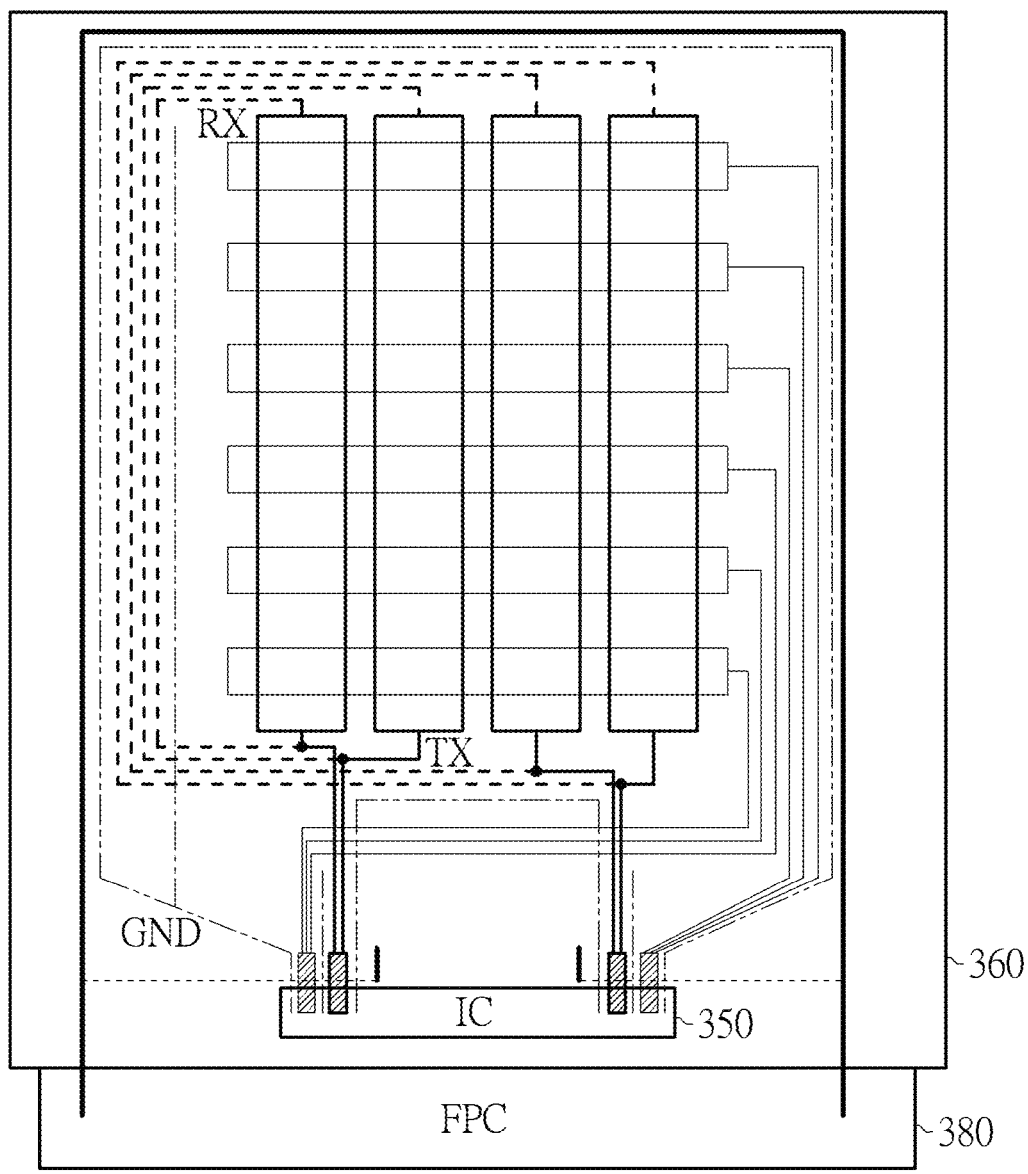
FIG. 3 is a diagram of a TDDI panel according to a third embodiment.
Figure 4:
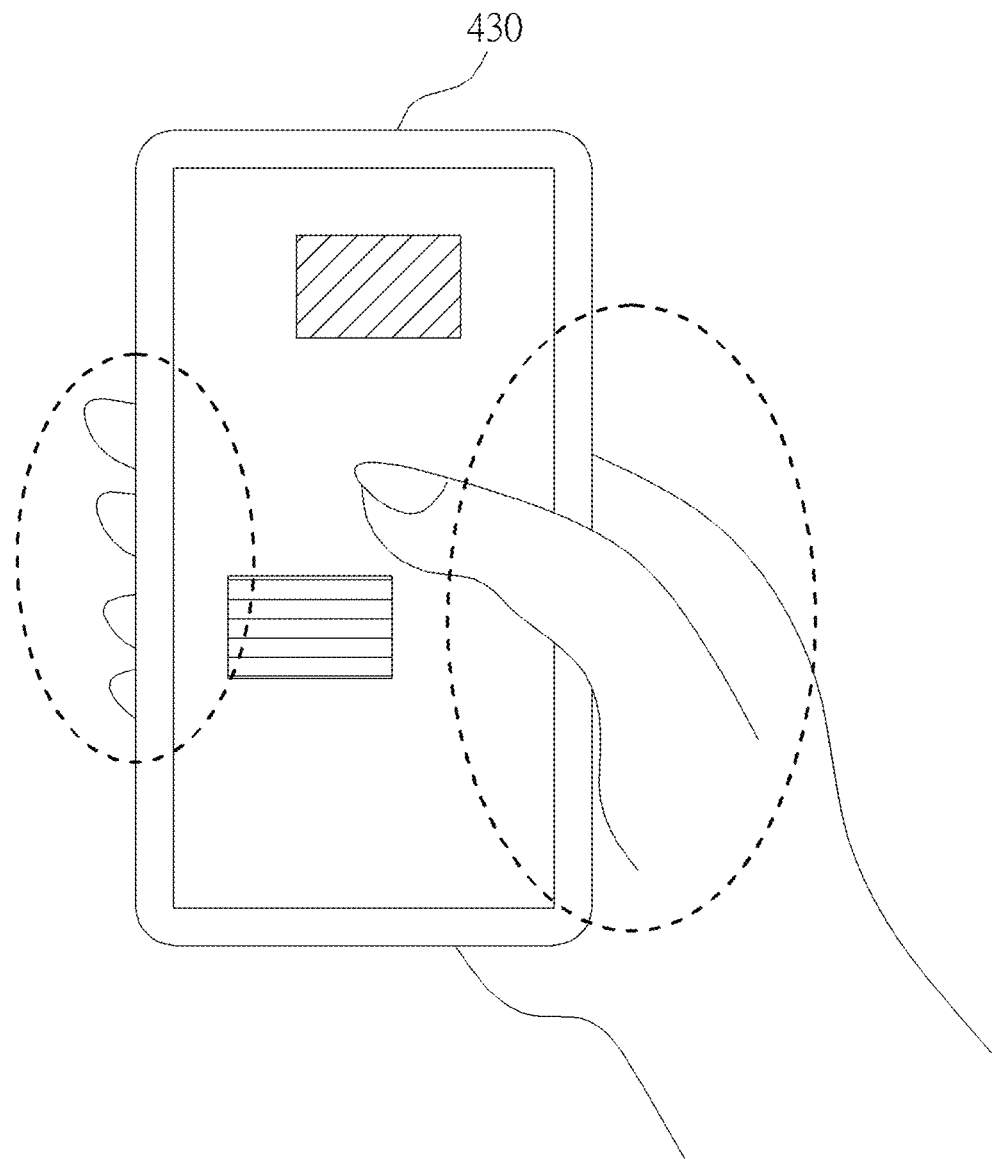
FIG. 4 is a diagram of a mobile phone adopting the electronic traces routing method shown in FIG. 2.
Figure 5:
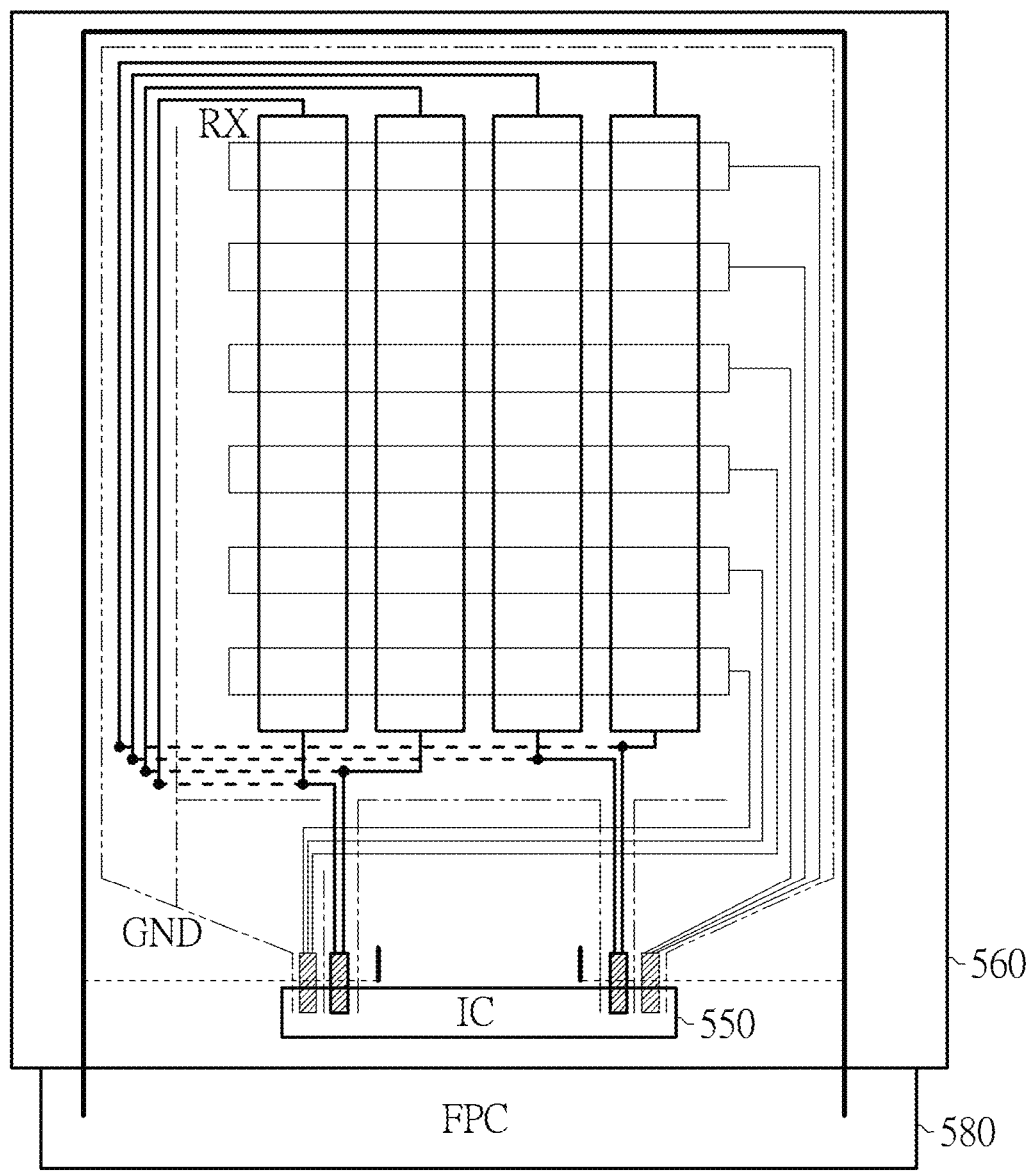
FIG. 5 is a diagram of a TDDI panel according to a first embodiment of the present invention.

Refer to FIG. 5, which is an illustration of a TDDI chip 500 according to an exemplary embodiment of the present invention. As shown in the diagram, Tx traces are routed on the left side of the display panel 560 to the IC 550, and Rx traces are routed on the right side of the display panel 560 to the IC 550, as in FIG. 3. The difference, however, is that the vertical Tx traces are in a first metal layer M1, but the horizontal Tx traces are in a second metal layer M2. As is well-known, vias (not illustrated) are used to route the traces between the different layers. Further, the horizontal routing from the leftmost Tx sensor element is at the bottom of all four horizontal traces, with the horizontal routing from the middle left/centre left Tx sensor element being directly above, followed by the horizontal routing from the middle right/centre right Tx column, and finally the horizontal routing from the rightmost Tx column. The Rx routing is the same as in FIG. 3. The ground lines are slightly different.

Figure 6A:
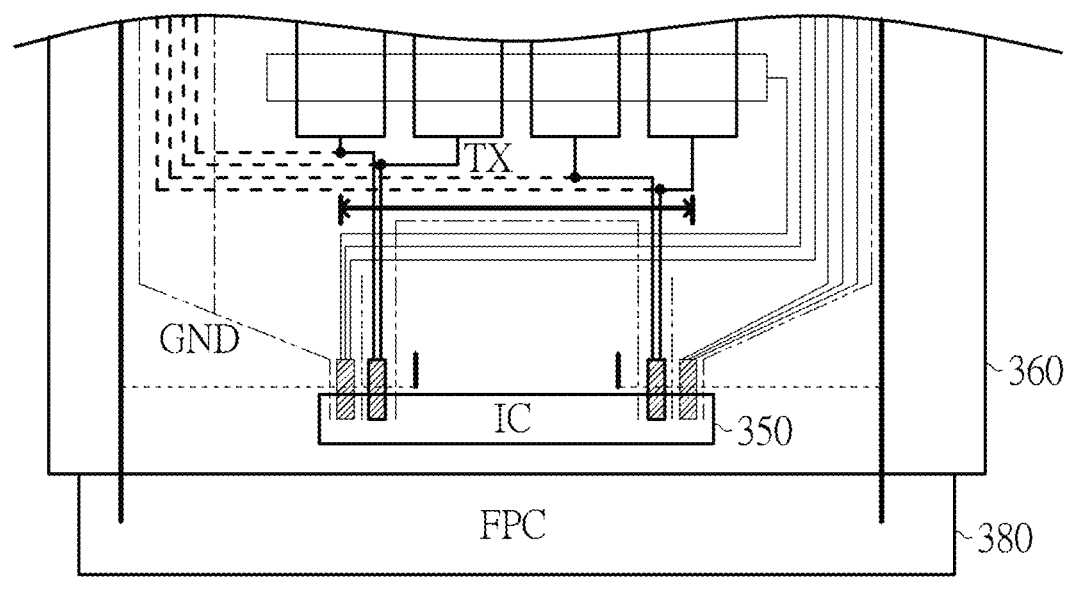
FIG. 6A is a diagram of routing traces of the bottom of a TDDI panel according to the embodiment illustrated in FIG. 2.

The reordering of the horizontal traces results in a significantly reduced coupling effect between the Rx and Tx traces. Refer to FIG. 6A, which illustrates the horizontal traces in the embodiment shown in FIG. 3. As indicated by the arrow, coupling will occur between the Rx traces and the Tx traces over the entire width of the IC 360, due to the Rx traces and the Tx traces being in close proximity over the entire width of the IC 360.

Figure 6B:
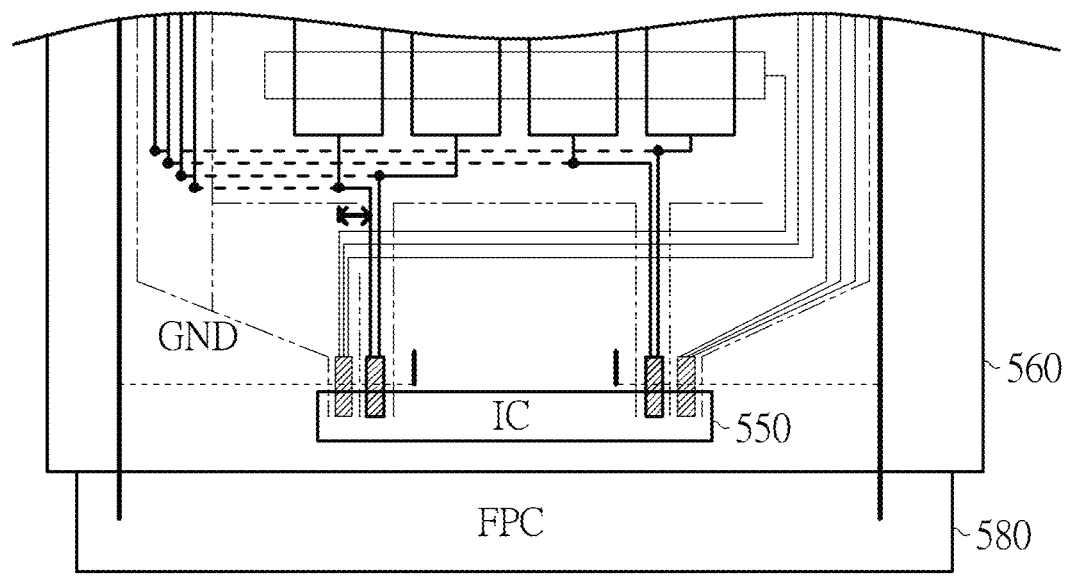
FIG. 6B is a diagram of routing traces of the bottom of the TDDI panel shown in FIG. 5.

Refer to FIG. 6B, which illustrates the horizontal traces in the embodiment shown in FIG. 5. As indicated by the arrow, due to the different routing method of the invention, the Tx traces and Rx traces are only in close proximity in the space between the left side Tx and Rx pins of the IC 560, such that coupling will only occur in this area. By comparing the two diagrams, it can be seen that the distance over which coupling will occur in FIG. 6B is a significantly smaller distance than in FIG. 6A.

Note that the embodiment illustrated in FIG. 5 can also swap the metal layers used for the Tx and Rx traces such that the internal and external order of the traces is changed. The practical effect of this is the distance between the closest Rx and Tx traces is further reduced.

Figure 7:
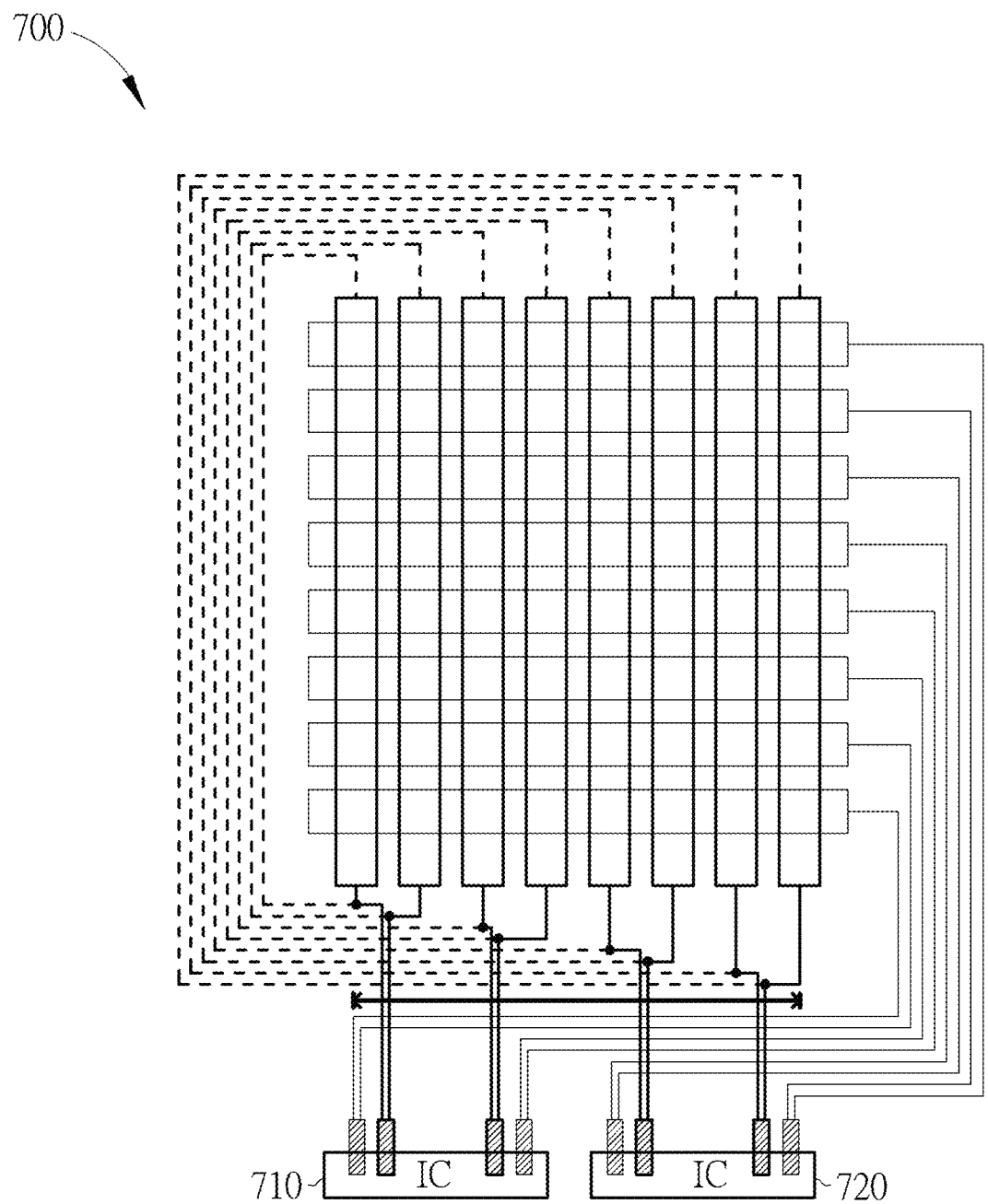
FIG. 7 is a diagram of a double IC TDDI panel.

The above embodiments all illustrate a routing method for a single IC TDDI display panel. The concept of the present invention can also apply to a mutual TDDI cascade display panel comprising more than one IC, which will be used in larger portable devices requiring larger displays. Refer to FIG. 7, which is an illustration of a related art mutual TDDI cascade display panel 700. As illustrated in the drawing, by using the standard routing method for the wiring traces, the coupling effect in this type of display panel will occur across the entire width of both the ICs 710, 720, as the longest horizontal Tx trace is positioned closest to the longest horizontal Rx trace. The use of two ICs resulting in a wider display screen will therefore increase the coupling issue of the related art.

Figure 8:
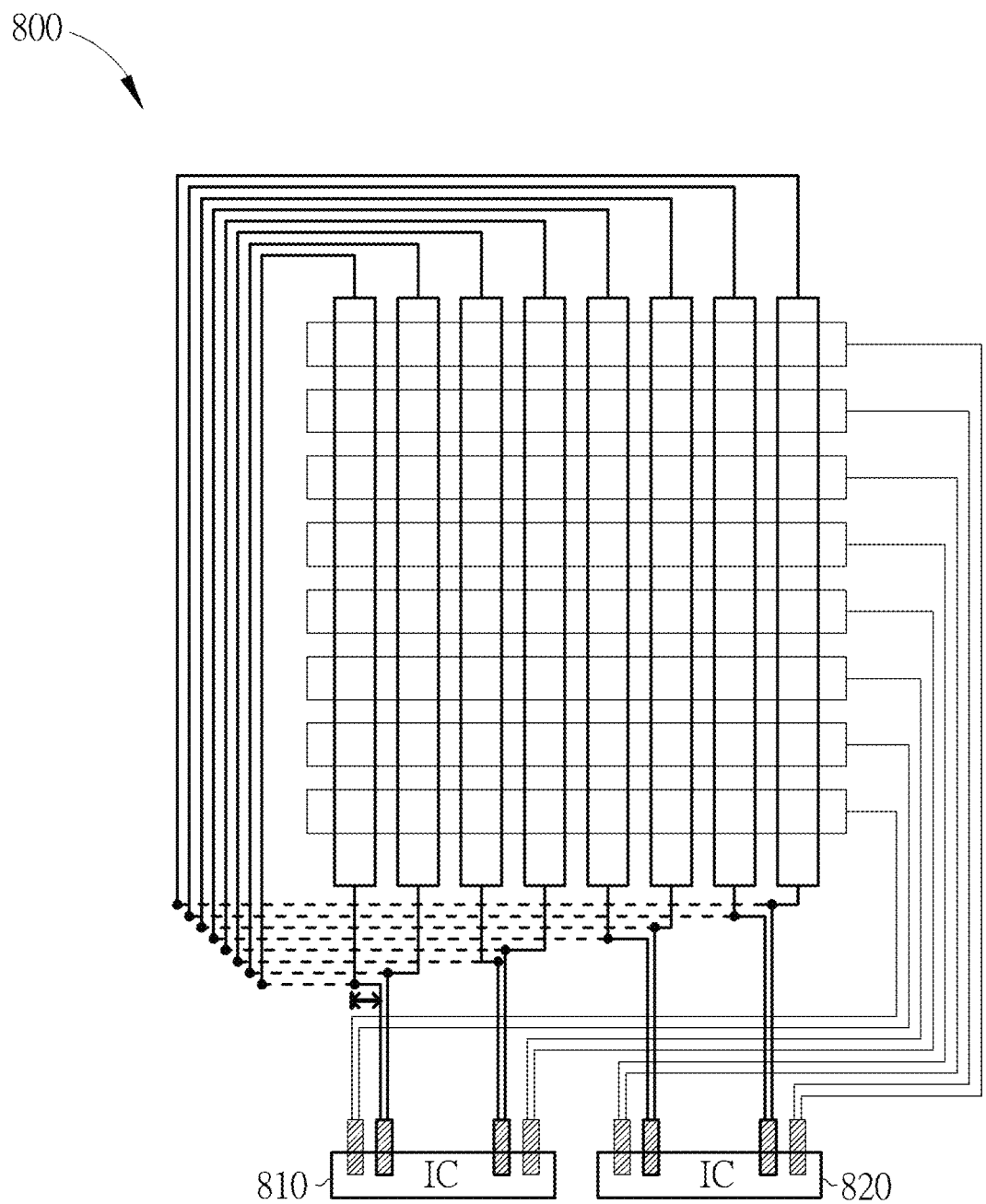
FIG. 8 is a diagram of a double IC TDDI panel according to a second embodiment of the present invention.

The routing method illustrated in FIG. 5 can also be used in the display panel shown in FIG. 7, in order to significantly reduce this coupling issue. Refer to FIG. 8, which is a diagram of a mutual TDDI cascade display panel 800 according to an exemplary embodiment of the present invention. As shown in the diagram, the pin configuration of each individual IC 810 is the same as the pin configuration of the IC 550. All traces from the receiving electrodes are routed to the right side of the display panel and then across the bottom of the display panel, and coupled to the Rx pins in both ICs 810. The traces from the transmitting electrodes are similarly routed to the left side of the display panel wherein a trace from the leftmost transmitting sensor element is routed closest to the array at the top, and routed furthest away from the same transmitting sensor element at the bottom. A trace from the rightmost transmitting sensor element is routed furthest from the array at the top and routed closest to the same transmitting sensor element at the bottom. The other traces are routed in a sequential fashion, such that the traces from the transmitting sensor elements are routed sequentially at the top, and are routed in a stepwise fashion at the bottom. This ensures that the coupling distance between the trace from the leftmost transmitting sensor element and the trace from the bottom receiving sensor element is very small, as indicated by the arrow.

Figure 9:
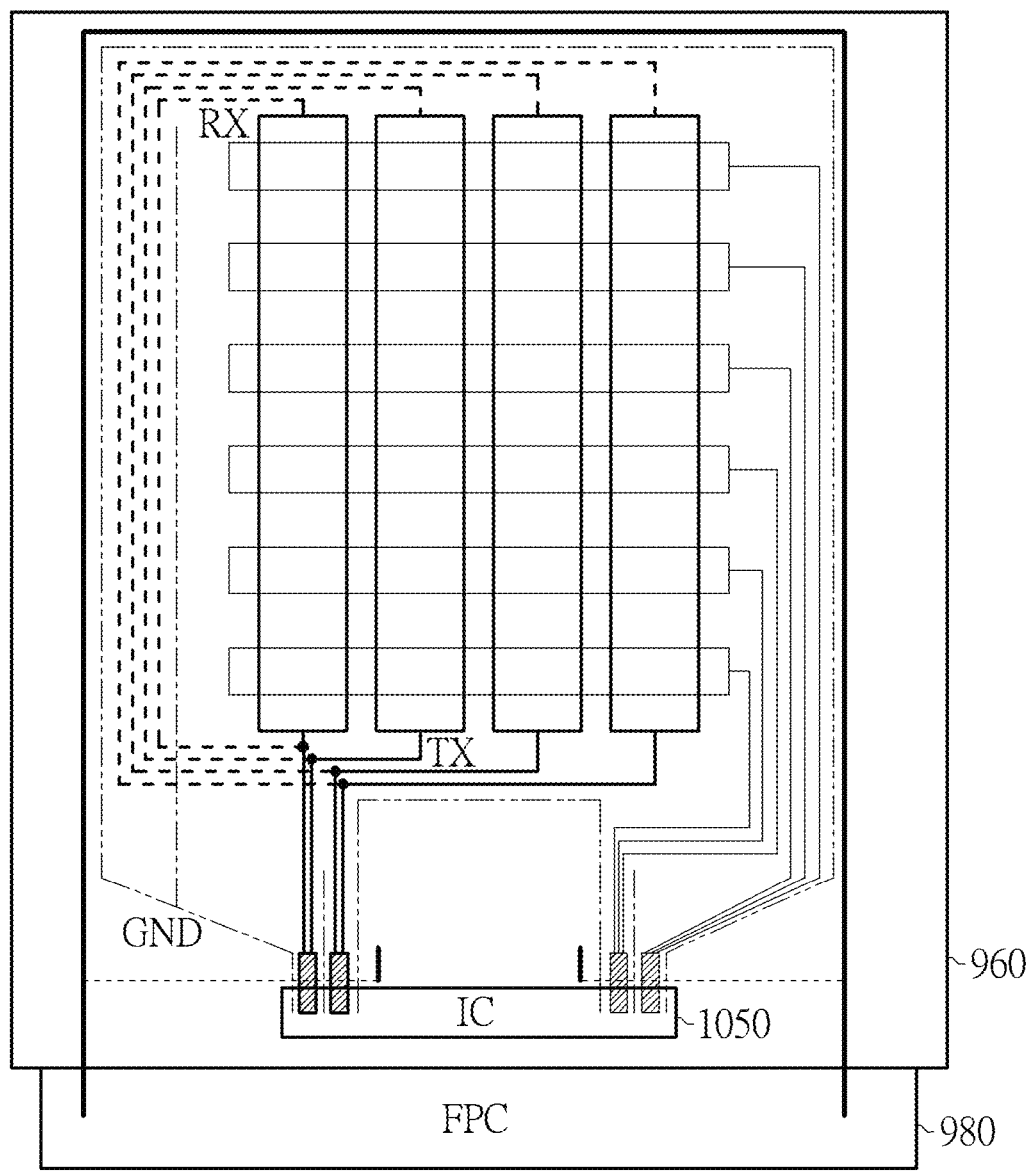
FIG. 9 is a diagram of a single IC TDDI panel with a different pin configuration according to a third embodiment of the present invention.

Refer to FIG. 9, which is a diagram of a display panel 900 comprising a single IC 950, wherein the pin configuration comprises two Tx pins at the left of the IC and two Rx pins at the right of IC 950. Due to this pin configuration, the routing of both the Tx and the Rx traces can be as the 2T1R related art routing method illustrated in FIG. 3.

As illustrated by the embodiment shown in FIG. 9, when the pin configuration on the IC 950 is altered, this can effectively reduce the coupling between the Tx and Rx traces without requiring rerouting. Although altering the pin configuration of the IC can incur costs, it has the added benefit of reducing a gap between the bottom of the display panel 960 and the top of the IC 950, as the traces can be more effectively routed to the IC 950 according to a specific pin configuration. The following embodiments similarly employ various pin configurations in the IC, with the objective of reducing the overall size of a touch display panel.

Figure 10:
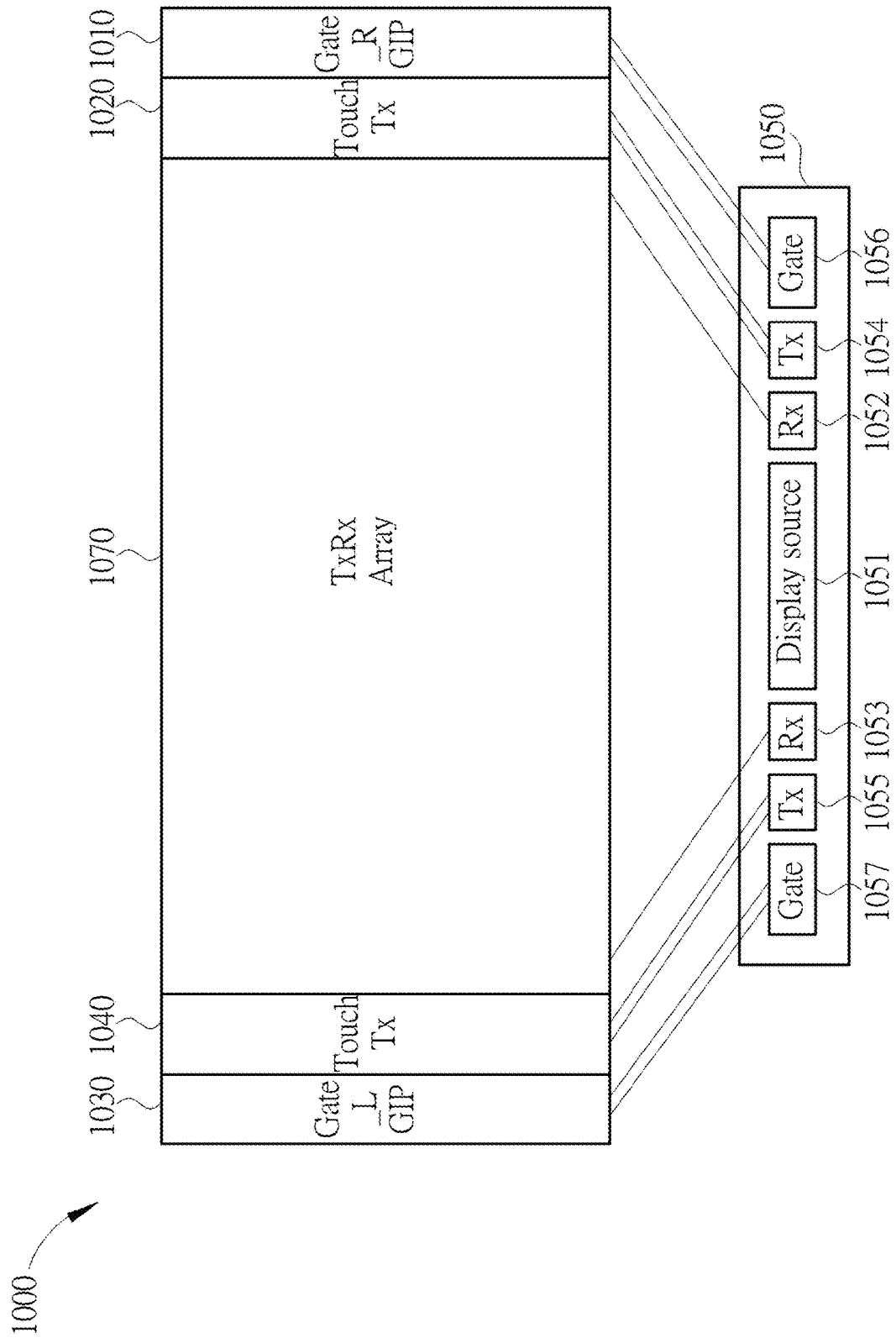
FIG. 10 is a diagram of a pin configuration on an IC pad coupled to a touch display according to an exemplary embodiment of the present invention.

Refer to FIG. 10, which is a diagram of a touch display 1000 which illustrates a pin configuration on an IC pad 1050 coupled to a touch display 1070 according to an exemplary embodiment of the present invention. The touch display panel 1070 comprises capacitive array formed of receptor and transmitter elements, and left and right gate in panel (GIP) driving circuits. The Tx touch driver is also formed at both sides of the touch display panel 1070, so that the wiring traces from the transmitting electrodes are coupled to the IC 1050 at the side of the display panel 1070 while the wiring traces from the receiving electrodes are coupled to the IC 1050 at the bottom of the display panel 1070. The wiring traces employ fanout routing, wherein there is a specific routing pattern connecting to a blind via for forming a direct connection to a next signal layer, and the specific routing pattern uses a small trace at a 45 degree angle.

As illustrated in the diagram, the pin configuration of the IC 1050 comprises a left gate pad 1057, a left Tx pin 1055, a left Rx pin 1053, a display source driver pad 1051 positioned in the centre of the IC 1050, a right Rx pin 1052, a right Rx pin 1054, and a right gate pad 1056. This pin configuration relies on the traces from the transmitting electrodes to be at the side of the display panel 1070 in order to achieve the shortest connection between the display panel 1070 and the IC 1050.

Figure 11:
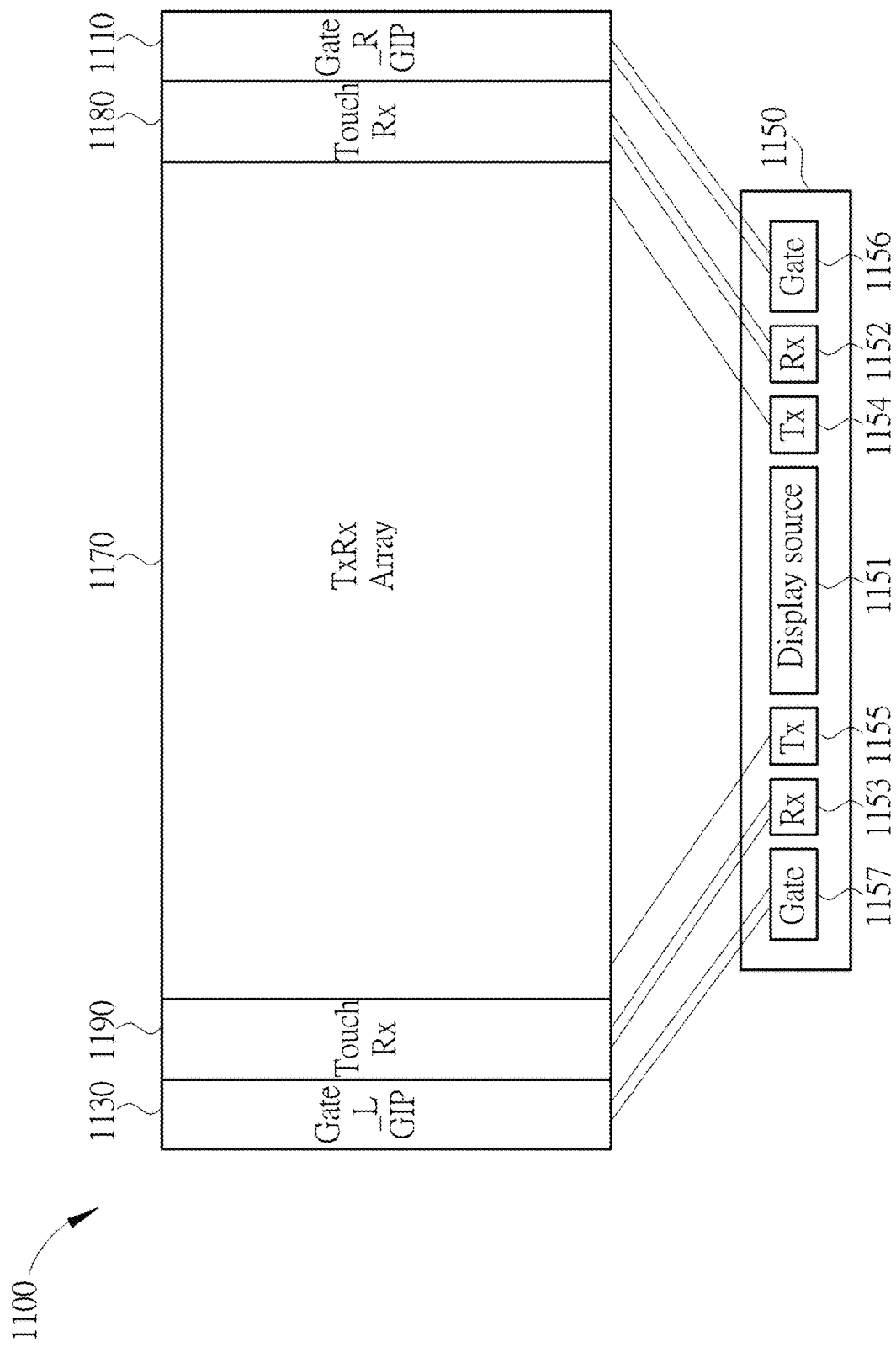
FIG. 11 is a diagram of pin configuration on an IC pad coupled to a touch display according to an exemplary embodiment of the present invention.

If the touch display requires a different routing method or capacitive array, the routing from the display panel to the IC may be more complicated and take up more space than is desirable. In order to solve this problem, the present invention provides a display panel 1100 with a different pin configuration as illustrated in FIG. 11. The touch display 1100 comprises a display panel 1170, with Rx drivers 1190, 1180, built into the display panel, as well as gate in panel (GIP) drivers 1130, 1110 on (respectively) the left and right sides of the display panel 1170. Due to the routing from the receiving electrodes being at the side of the display panel 1170, the touch display 1100 in FIG. 11 reverses the placement of the Tx and Rx pins on the IC 1150, so the pin configuration is the left gate pad 1157, the left Rx 1153, the left Tx 1155, a display source driver pad 1151 at the centre, a right Tx 1154, a right Rx 1152, and a right gate pad 1156.

Figure 12:
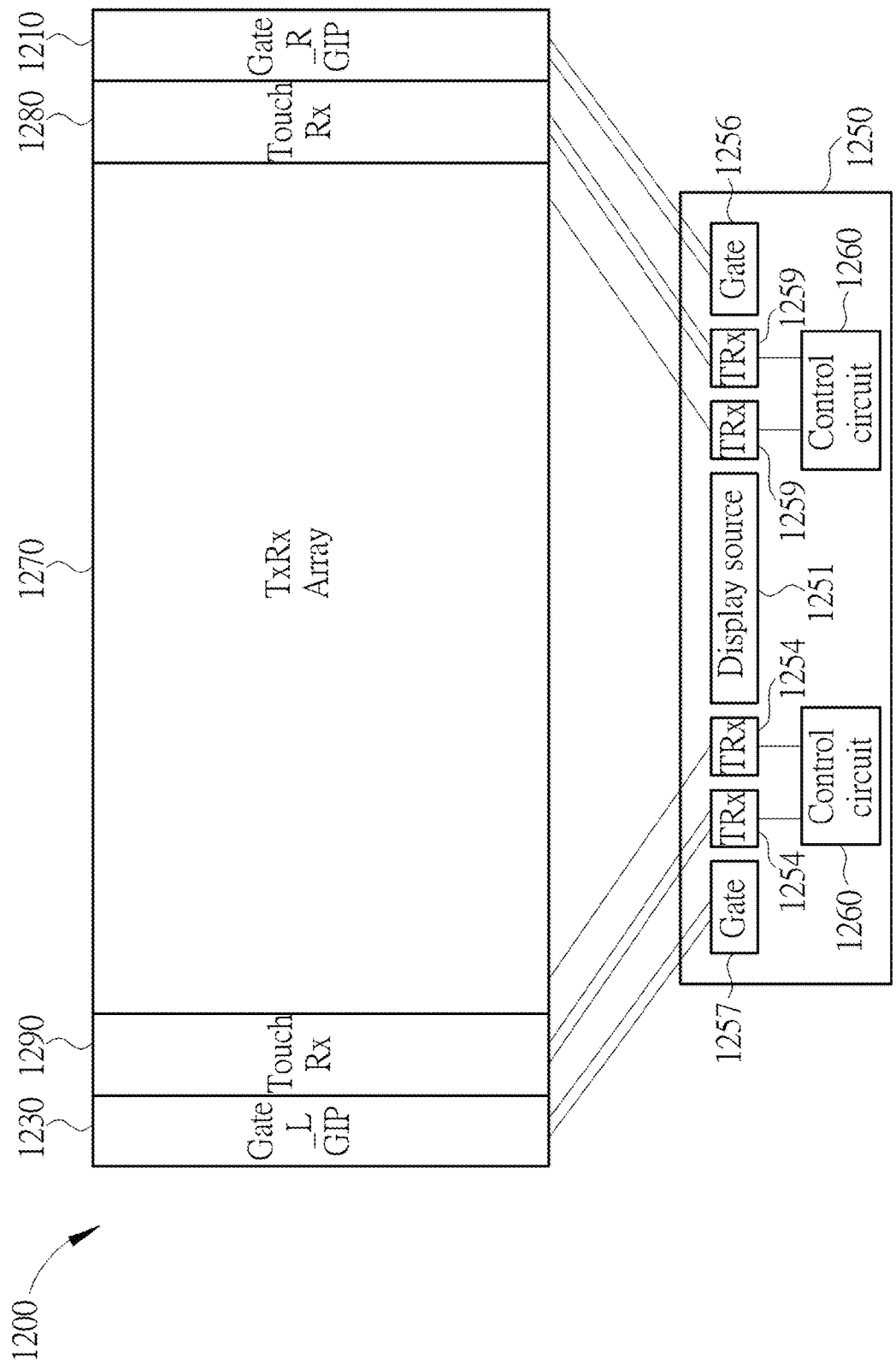
FIG. 12 is a diagram of pin configuration on an IC pad coupled to a touch display according to an exemplary embodiment of the present invention.

In some touch displays, the pins for receiving the transmitting or receiving electrodes can adaptively switch, as illustrated in FIG. 12, which illustrates a touch display 1200. The IC 1250 in FIG. 12, rather than including separate Rx and Tx pins, comprises four TRx pins which can be coupled to the receiving or the transmitting electrodes. The IC 1250 therefore also includes control circuits 1260 which are for controlling the four TRx pins 1259 to correspond to the receiving or the transmitting electrodes, such that the pin configuration can be dynamically switched according to a control signal.

Figure 13:
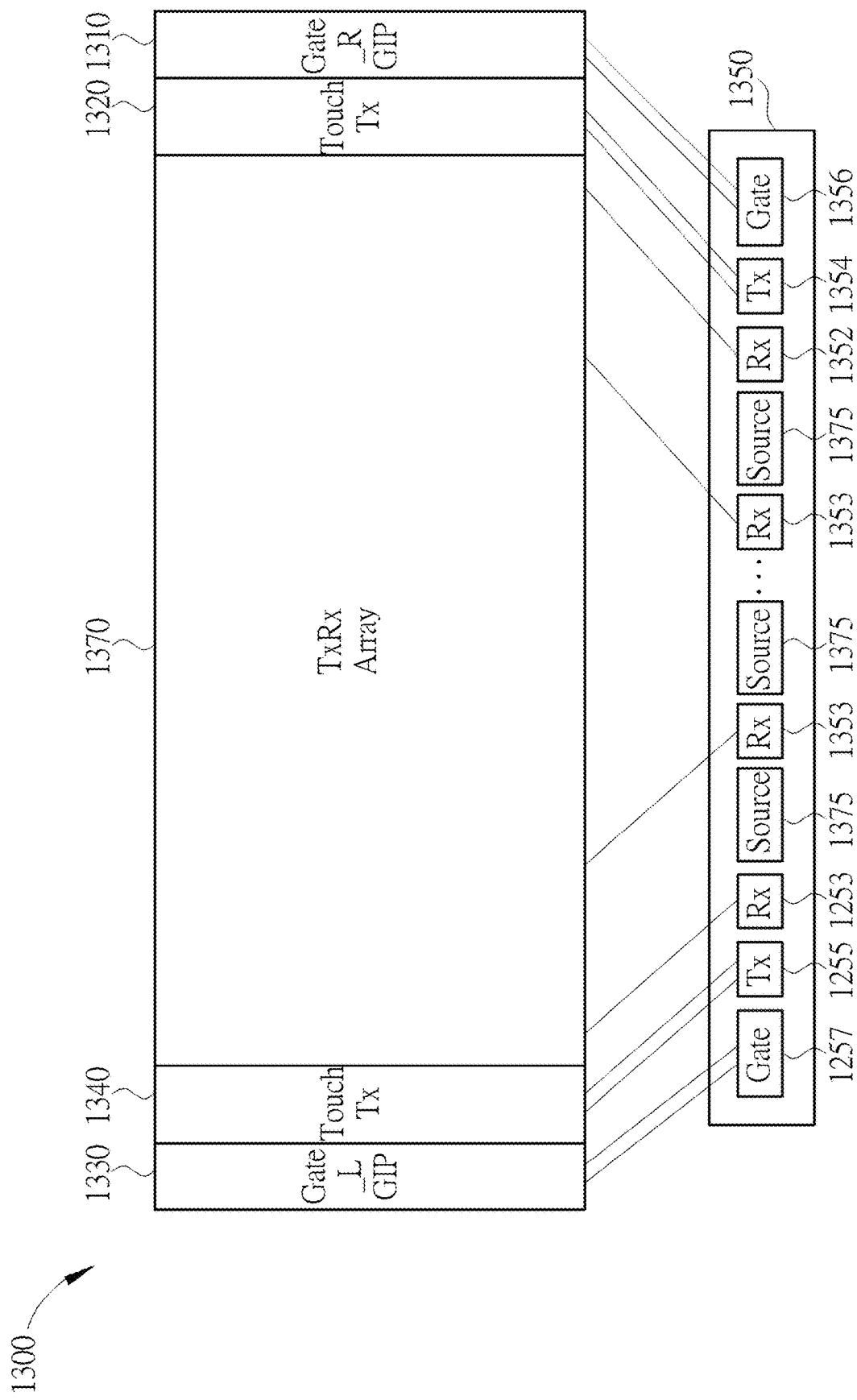
FIG. 13 is a diagram of pin configuration on an IC pad coupled to a touch display according to an exemplary embodiment of the present invention.

As illustrated in the touch displays shown in FIG. 10~FIG. 12, the display source pad is placed in the centre of the IC, but takes up a large amount of space, which will create a larger gap between the display panel and the IC due to requirements of routing from transmitting/receiving electrodes to corresponding Tx and Rx pins. Therefore, the present invention provides a touch display 1300 as illustrated in FIG. 13. In this embodiment, the pin configuration of the IC 1350 divides the display source pad into smaller source pads 1375, and distributes left Rx pins 1353 and right Rx pins 1352 in a staggered and sequential way between the display source pads 1375.

Figure 14:
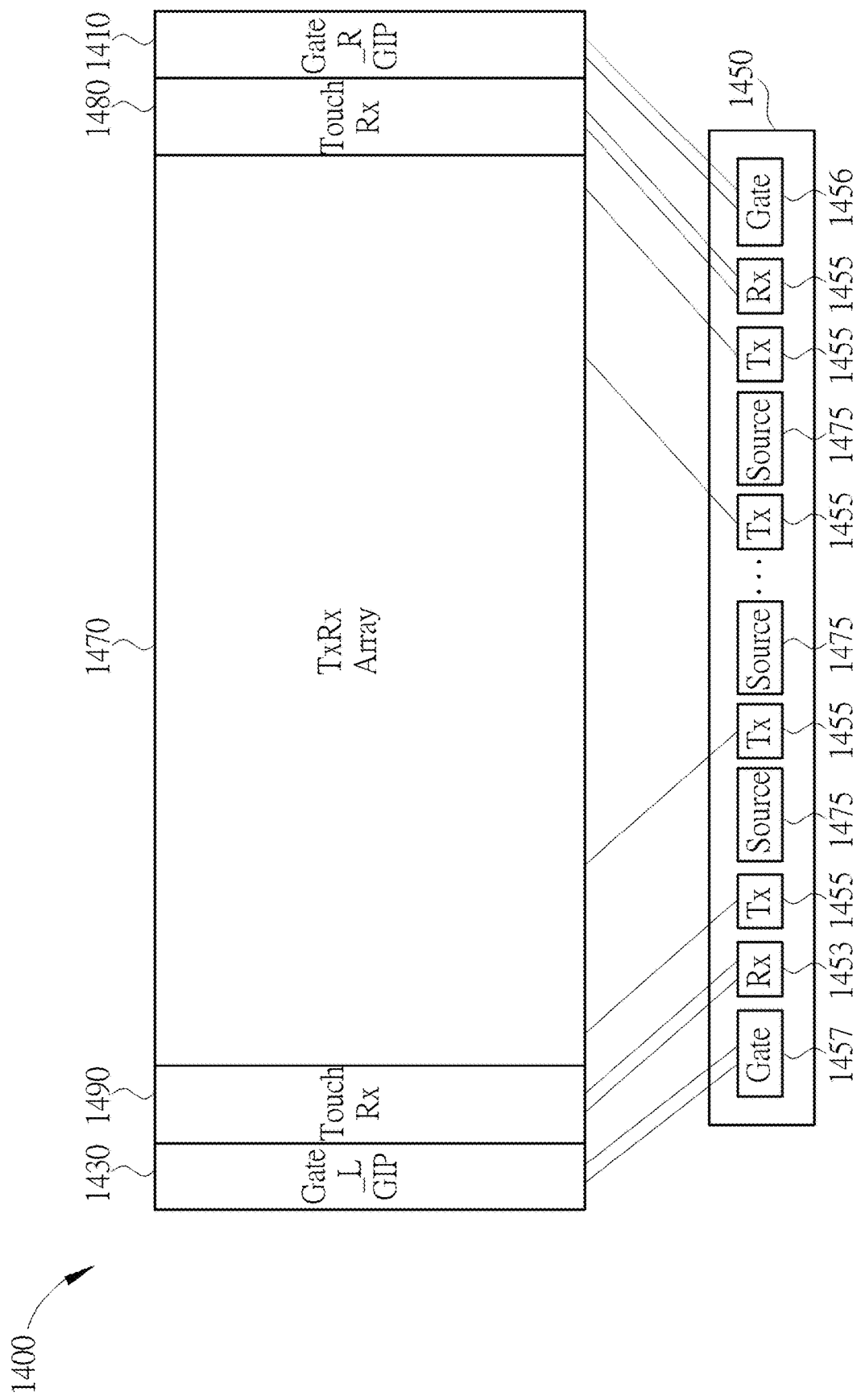
FIG. 14 is a diagram of pin configuration on an IC pad coupled to a touch display according to an exemplary embodiment of the present invention.

Because the embodiment shown in FIG. 13 has the traces from the transmitting electrodes routed down the sides of the display panel 1370, the routing from the bottom of the display panel 1370 to the IC 1350 does not require much space, unlike the traces from the receiving electrodes. In an alternative embodiment, the configuration of the transmitting and receiving electrodes are reversed with respect to the embodiment shown in FIG. 13. This is illustrated in FIG. 14, which shows a touch display 1400 comprising a display panel 1470 and an IC 1450. In this embodiment, the traces from the receiving electrodes are routed down both sides of the display panel 1470, so the IC 1450 places the Rx pins 1453, 1452 next to, respectively, the left gate pad 1457 and the right gate pad 1456. The source pads 1475 are divided into many pins and the Tx pins 1455, 1454 are staggered sequentially between the source pads 1475.

Figure 15:
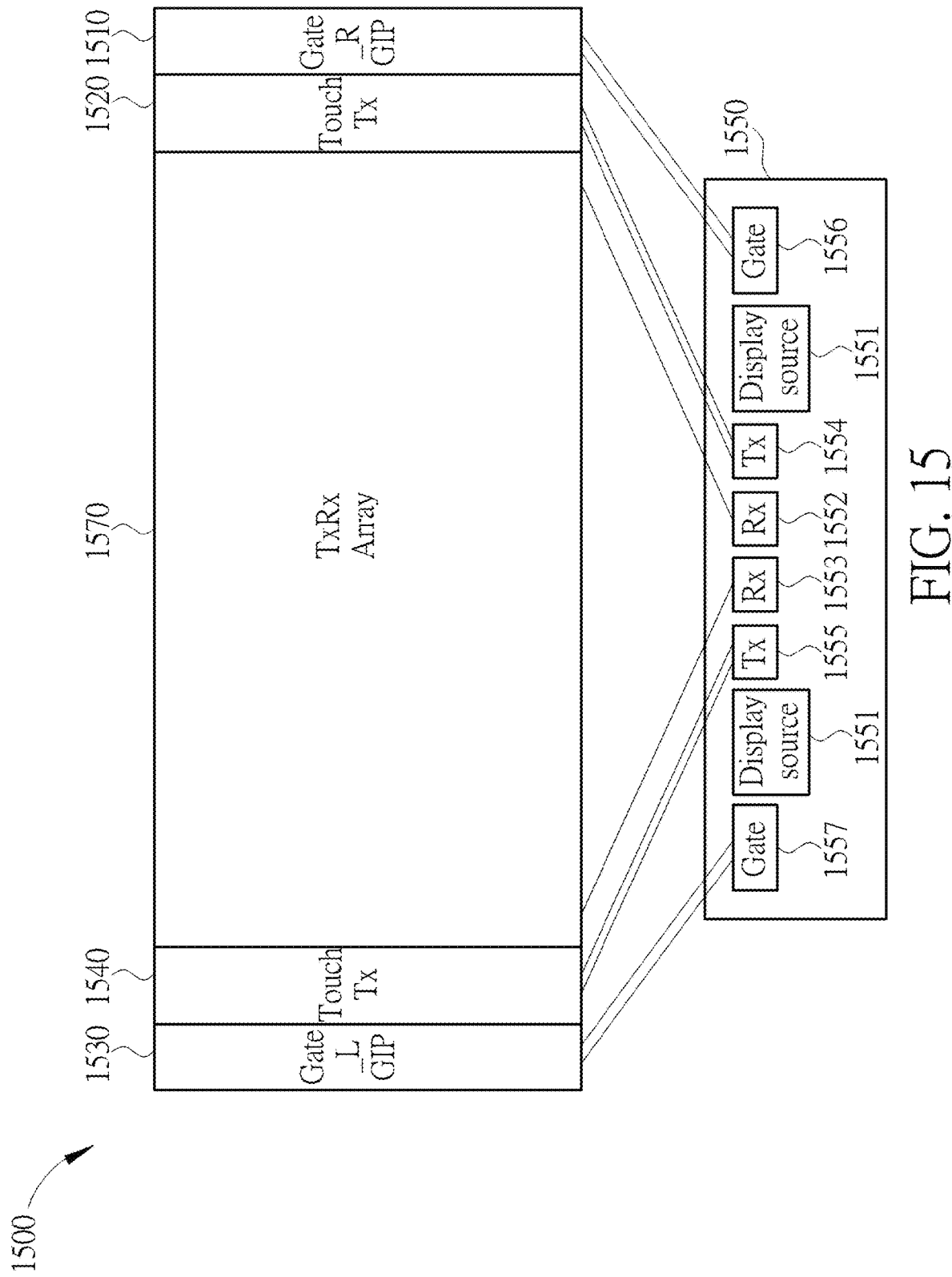
FIG. 15 is a diagram of pin configuration on an IC pad coupled to a touch display according to an exemplary embodiment of the present invention.

In another embodiment, it is preferable to position the display source pins closer to the edges of the IC, as it improves the connection. This is illustrated in FIG. 15, which shows a touch display 1500 according to another embodiment of the present invention. In this embodiment, traces from the transmitting electrodes are routed down the sides of the display panel 1570. The Tx pins 1555, 1554 and Rx pins 1553, 1552 are positioned in the centre of the IC 1550.

Figure 16:
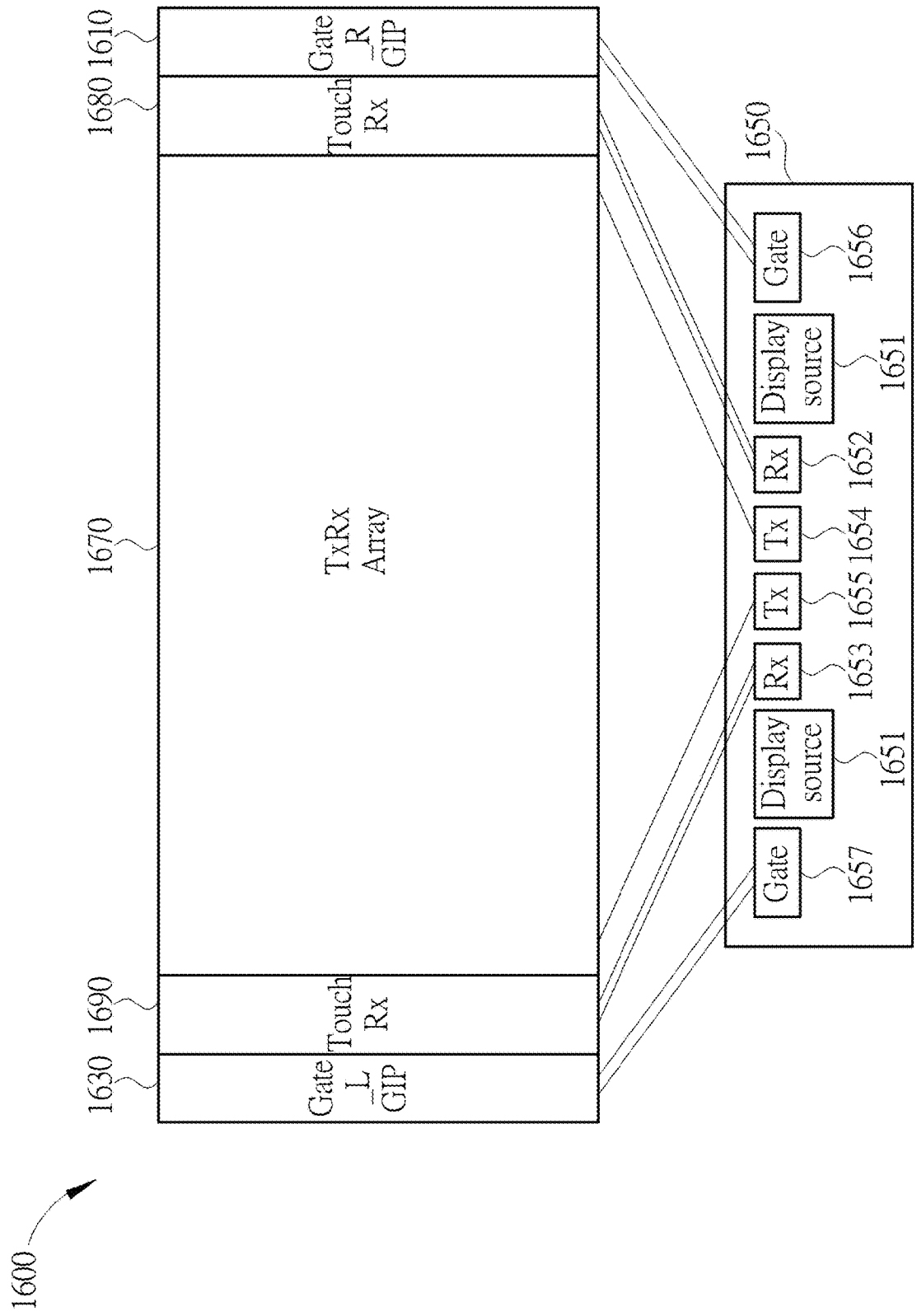
FIG. 16 is a diagram of pin configuration on an IC pad coupled to a touch display according to an exemplary embodiment of the present invention.

As the traces from the transmitting electrodes are routed down the sides of the display panel 1570 in the embodiment shown in FIG. 15, the IC 1550 places the Tx pins 1555 and 1554 on the outside, and the Rx pins 1553, 1552 are placed on the inside. In the touch display 1600 shown in FIG. 16, the traces from the receiving electrodes are routed down the sides of the display panel 1670; therefore, the positioning of the pins on the IC 1650 places the Tx pins 1655, 1654 in the centre, and the Rx pins 1653, 1652 are on the outside.

Figure 17:
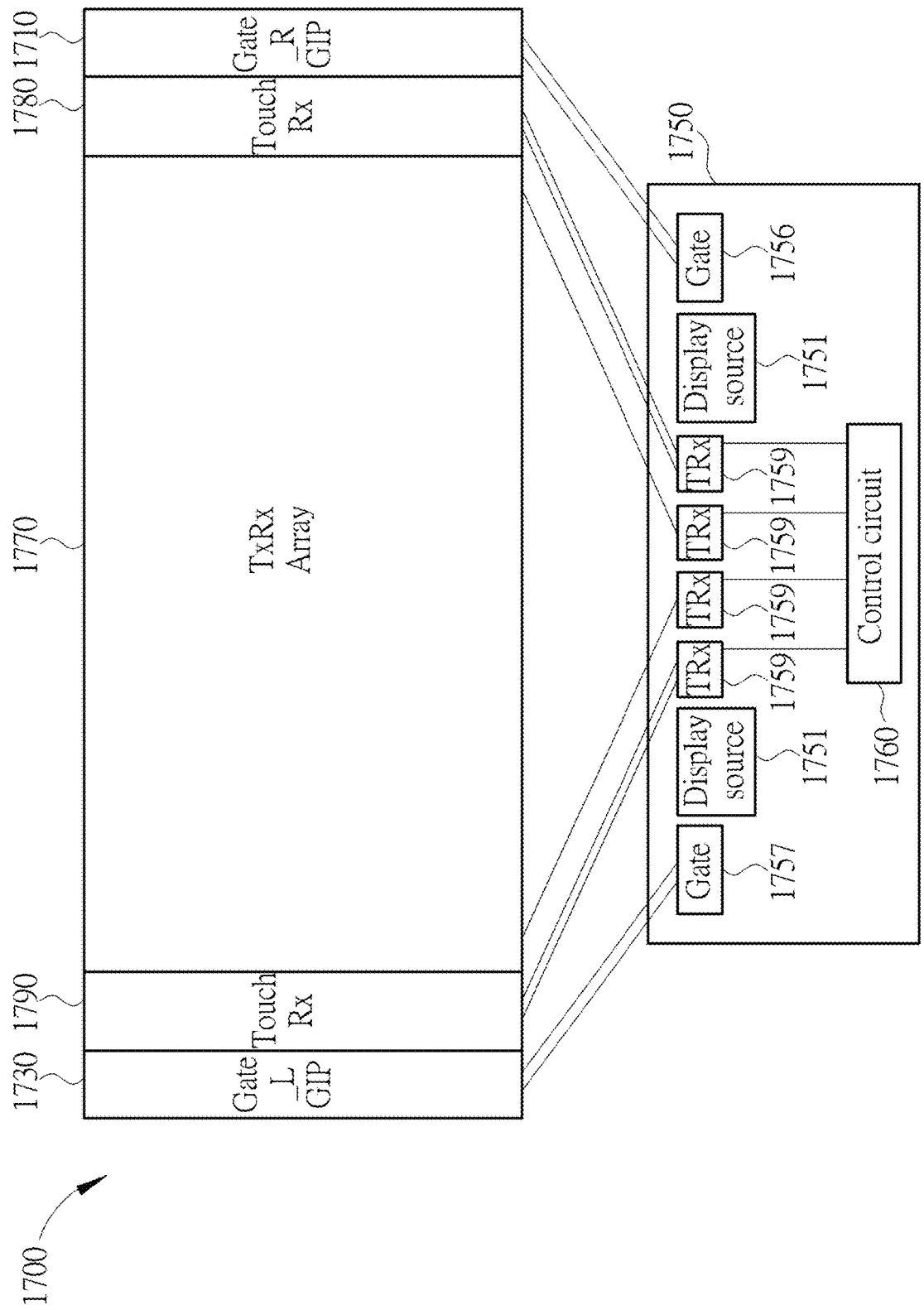
FIG. 17 is a diagram of pin configuration on an IC pad coupled to a touch display according to an exemplary embodiment of the present invention.

A final embodiment of the pin configuration illustrated in FIG. 17 uses the TRx pins but also places them in the centre of the IC 1750. As the placing of the display source pads towards the outside of the IC 1750 improves the connection with the source driver but reduces the connection between the TX, Rx pins and transmitting and receiving electrodes, using TRx pins 1759 can improve the signal connectivity. As in the embodiment shown in FIG. 12, the touch display 1700 also comprises a control circuit 1760 in the IC 1750 for controlling whether the TRx pins 1759 are for receiving signals from the transmitting or receiving electrodes.

The above embodiments provide different configurations and layouts for touch display panels which can improve the coupling effect and save space when designing a touch display, which can give rise to lighter and more economical touch displays. By providing flexible pin configurations, an IC can be bonded to a touch display panel with a reduced overall area. Routing methods for wiring traces coupling a capacitive array of the touch display panel to dedicated pins on the IC can reduce coupling between transmitting and receiving traces, thereby providing a touch display panel with increased touch response and accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable device, comprising:
an integrated circuit (IC) comprising at least a first receiver pin, a first transmitter pin, a second receiver pin and a second transmitter pin, wherein the first receiver pin and the first transmitter pin are located at a left side of the IC, and the second receiver pin and the second transmitter pin are located at a right side of the IC;
a touch display panel, bonded directly to the IC, and comprising a capacitive array consisting of a plurality of transmitter elements arranged vertically and a plurality of receiver elements arranged horizontally, wherein a part of the plurality of transmitter elements is coupled to the first transmitter pin, another part of the plurality of transmitter elements is coupled to the second transmitter pin, a part of the plurality of receiver elements is coupled to the first receiver pin, and another part of the plurality of receiver elements is coupled to the second receiver pin;
a first plurality of traces at the top, a first vertical side and the bottom of the touch display panel, and respectively coupled between a top of each transmitter element of the plurality of transmitter elements and a bottom of each transmitter element;
a second plurality of traces respectively coupled between the first plurality of traces at the bottom of the capacitive array and the IC; and
a third plurality of traces on a second vertical side of the touch panel integrated circuit opposite to the first side and respectively coupled between the plurality of receiver elements and the IC;
wherein a first trace of the first plurality of traces is coupled between a leftmost transmitter element of the capacitive array and the first trace is positioned closest to the capacitive array at the top of the capacitive array, closest to the capacitive array at the first vertical side, and furthest away from the capacitive array at the bottom of the capacitive array, and a second trace of the first plurality of traces is coupled between a rightmost transmitter element of the capacitive array and the second trace is positioned furthest away from the capacitive array at the top of the capacitive array, furthest away from the capacitive array at the first vertical side, and closest to the capacitive array at the bottom of the capacitive array.

2. The portable device of claim 1, wherein a third trace of the first plurality of traces is coupled between a centre left transmitter element of the capacitive array, and the third trace is positioned between the first trace and the second trace of the first plurality of traces at the top of the capacitive array, between the first trace and the second trace of the first plurality of traces at the first vertical side, and positioned between the first trace and the second trace of the second plurality of traces at the bottom of the capacitive array, and a fourth trace of the first plurality of traces is coupled between a centre right transmitter element, and the fourth trace is positioned between the second trace and the third trace of the first plurality of traces at the top of the capacitive array, positioned between the second trace and the third trace of the first plurality of traces at the first vertical side, and positioned between the second trace and the third trace of the second plurality of traces at the bottom of the capacitive array.

3. The portable device of claim 2, wherein a first trace of the second plurality of traces is coupled between the leftmost transmitter element at the bottom of the capacitive array and the first transmitter pin, a second trace of the second plurality of traces is coupled between the centre left transmitter element at the bottom of the capacitive array and the first transmitter pin, a third trace of the second plurality of traces is coupled between the centre right transmitter element at the bottom of the capacitive array and the second transmitter pin, and a fourth trace of the second plurality of traces is coupled between the rightmost transmitter element at the bottom of the capacitive array and the second transmitter pin.

4. The portable device of claim 1, wherein half of the third plurality of traces are respectively coupled between half of the plurality of receiver elements and the first receiver pin, and the other half of the third plurality of traces are respectively coupled between the other half of the plurality of receiver elements and the second receiver pin.

5. The portable device of claim 1, wherein the touch display panel comprises a first metal layer and a second metal layer which are spatially separated from and electrically isolated from each other, wherein the second plurality of traces are in the first metal layer of the touch display panel, the third plurality of traces are in the second metal layer of the touch display panel, and the first plurality of traces are located in both the first metal layer and the second metal layer of the touch display panel.

6. The portable device of claim 1, wherein the touch display panel is a touch display driver integration (TDDI) panel.

7. The portable device of claim 2, wherein the IC comprises:
a first IC comprising the first transmitter pin and the first receiver pin and further comprising a third transmitter pin and a third receiver pin; and
a second IC comprising the second transmitter pin and the second receiver pin and further comprising a fourth transmitter pin and a fourth receiver pin.

8. The portable device of claim 7, wherein a first trace of the second plurality of traces is coupled between the leftmost transmitter element at the bottom of the capacitive array and the first transmitter pin, a second trace of the second plurality of traces is coupled between the centre left transmitter element at the bottom of the capacitive array and the third transmitter pin, a third trace of the second plurality of traces is coupled between the centre right transmitter element at the bottom of the capacitive array and the fourth transmitter pin, and a fourth trace of the second plurality of traces is coupled between the rightmost transmitter element at the bottom of the capacitive array and the second transmitter pin.

9. The portable device of claim 8, wherein a first trace of the third plurality of traces is coupled between a first receiver element and the second receiver pin, a second trace of the third plurality of traces is coupled between a second receiver element and the second receiver pin, a third trace of the third plurality of traces is coupled between a third receiver element and the fourth receiver pin, a fourth trace of the third plurality of traces is coupled between a fourth receiver element and the fourth receiver pin, a fifth trace of the third plurality of traces is coupled between a fifth receiver element and the third receiver pin, a sixth trace of the third plurality of traces is coupled between a sixth receiver element and the third receiver pin, a seventh trace of the third plurality of traces is coupled between a seventh receiver element and the first receiver pin, and an eighth trace of the third plurality of traces is coupled between an eighth receiver element and the first receiver pin, wherein the first receiver element, the second receiver element, the third receiver element, the fourth receiver element, the fifth receiver element, the sixth receiver element, the seventh receiver element and the eighth receiver element are arranged sequentially from top to bottom of the capacitive array, and the third plurality of traces are coupled below the first plurality of traces at the bottom of the capacitive array.

10. A touch display comprising:
a touch display panel comprising a capacitive sensor array consisting of a plurality of transmitting electrodes and a plurality of receiving electrodes, wherein the transmitting electrodes and the receiving electrodes are arranged at 90 degrees with respect to each other;
multiple touch drivers, coupled to a left side and a right side of the touch display panel, respectively; and
an integrated circuit (IC) coupled to the touch display panel, the IC comprising:
at least a first pin and a second pin of a first type for coupling to electronic traces of the first type coupled to the capacitive array, and at least a first pin and a second pin of a second type for coupling to electronic traces of the second type coupled to the capacitive array, wherein the first pin and the second pin of the second type are positioned in between the first pin and the second pin of the first type;
wherein the first pin and the second pin of the first type correspond to the multiple touch drivers; the electronic traces of the first type are coupled to the IC at the left side and the right side of the touch display panel; and the electronic traces of the second type are coupled to the IC at a bottom of the touch display panel;
wherein the first type and the second type is selected according to an arrangement of the transmitting electrodes and the receiving electrodes in the capacitive array.

11. The touch display of claim 10, wherein when the transmitting electrodes are arranged vertically in the capacitive array, the first type is selected as a transmitting type and the second type is selected as a receiving type.

12. The touch display of claim 10, wherein when the receiving electrodes are arranged vertically in the capacitive array, the first type is selected as a receiving type and the second type is selected as a transmitting type.

13. The touch display of claim 11, wherein the IC further comprises at least a third pin and a fourth pin of the second type, and the third pin and the fourth pin are positioned between the first pin and the second pin of the second type.

14. The touch display of claim 13, wherein the IC further comprises at least a first source pad, a second source pad and a third source pad, and the third pin is positioned between the first source pad and the second source pad, and the fourth pin is positioned between the second source pad and the third source pad.

15. The touch display of claim 10, wherein the IC further comprises a first display source pad and a second display source pad, and the first pin of the first type, the first pin of the second type, the second pin of the second type and the second pin of the first type are positioned between the first display source pad and the second display source pad.

16. The touch display of claim 10, wherein the IC further comprises:
a first control circuit coupled to the first pin of the first type and the first pin of the second type, wherein the first control circuit adaptively selects the first type and the second type; and
a second control circuit coupled to the second pin of the first type and the second pin of the second type, wherein the second control circuit adaptively selects the first type and the second type.

17. The touch display of claim 12, wherein the IC further comprises at least a third pin and a fourth pin of the second type, and the third pin and the fourth pin are positioned between the first pin and the second pin of the second type.

18. The touch display of claim 17, wherein the IC further comprises at least a first source pad, a second source pad and a third source pad, and the third pin is positioned between the first source pad and the second source pad, and the fourth pin is positioned between the second source pad and the third source pad.

19. The touch display of claim 15, wherein the IC further comprises a control circuit coupled to the first pin of the first type, the first pin of the second type, the second pin of the first type and the second pin of the second type, wherein the first control circuit adaptively selects the first type and the second type.

* * * * *